United States Patent
Bai et al.

(10) Patent No.: US 9,030,846 B2
(45) Date of Patent: May 12, 2015

(54) TRANSFORMER-BASED SWITCHING RESONANT POWER CONVERSION APPARATUS

(71) Applicants: Yong-Jiang Bai, Nanjing (CN); Qiao-Liang Chen, Nanjing (CN); Ju-Lu Sun, Nanjing (CN)

(72) Inventors: Yong-Jiang Bai, Nanjing (CN); Qiao-Liang Chen, Nanjing (CN); Ju-Lu Sun, Nanjing (CN)

(73) Assignees: FSP Technology Inc., Taoyuan (TW); FSP-Powerland Technology Inc., Nanjing (CN)

( * ) Notice: Subject to any disclaimer, the term of this patent is extended or adjusted under 35 U.S.C. 154(b) by 253 days.

(21) Appl. No.: 13/629,612

(22) Filed: Sep. 28, 2012

(65) Prior Publication Data
US 2013/0083564 A1   Apr. 4, 2013

(30) Foreign Application Priority Data
Sep. 29, 2011   (CN) .................. 2011 2 0368412 U (51) Int. Cl.
*H02M 3/335*   (2006.01)
*H02M 1/00*   (2006.01)

(52) U.S. Cl.
CPC .. *H02M 3/33592* (2013.01); *H02M 2001/0032* (2013.01); *Y02B 70/1433* (2013.01); *Y02B 70/1475* (2013.01); *Y02B 70/16* (2013.01); *H02M 2001/0058* (2013.01); *Y02B 70/1491* (2013.01)

(58) Field of Classification Search
USPC ............ 363/21.02, 21.03, 24, 25, 26, 95, 97
See application file for complete search history.

(56) References Cited

U.S. PATENT DOCUMENTS

| | | | |
|---|---|---|---|
| 8,213,189 B2* | 7/2012 | Nishikawa | 363/21.02 |
| 8,363,427 B2* | 1/2013 | Anguelov et al. | 363/21.02 |
| 2009/0284991 A1* | 11/2009 | Nishikawa | 363/21.02 |
| 2010/0202162 A1* | 8/2010 | Yang et al. | 363/21.02 |
| 2010/0232183 A1* | 9/2010 | Yang | 363/21.02 |
| 2011/0038180 A1* | 2/2011 | Yang | 363/17 |
| 2012/0250360 A1* | 10/2012 | Orr et al. | 363/21.02 |

* cited by examiner

*Primary Examiner* — Adolf Berhane
(74) *Attorney, Agent, or Firm* — Jianq Chyun IP Office (57) ABSTRACT

A resonant power conversion apparatus including a transformer-based resonant converter and first and second switch control units is provided. The transformer-based resonant converter includes a primary switch circuit and a secondary output circuit configured to provide an output voltage to a load. The first switch control unit is configured to control an ON/OFF operation of the primary switch circuit in response to a status of the load. The second switch control unit is configured to determine whether to activate or inactivate the first switch control unit. When the status of the load is the light-loading or the no-loading, the first switch control unit intermittently controls the ON/OFF operation of the primary switch circuit, and meanwhile, the first switch control unit is inactivated during the primary switch circuit is disabled, so as to substantially reduce the light-loading or no-loading loss of the resonant power conversion apparatus.

15 Claims, 6 Drawing Sheets

TRANSFORMER-BASED SWITCHING RESONANT POWER CONVERSION APPARATUS

CROSS-REFERENCE TO RELATED APPLICATION

This application claims the priority benefit of China application serial no. 201120368412.2, filed on Sep. 29, 2011. The entirety of the above-mentioned patent application is hereby incorporated by reference herein and made a part of this specification.

BACKGROUND OF THE INVENTION

1. Field of the Invention

The present invention relates to a power conversion technology, more particularly, to a resonant power conversion apparatus.

2. Description of the Related Art

The light-loading or no-loading loss of the switching power converter is mainly composed of the switching loss and other losses, wherein the switching loss includes the turn-on switching loss and the turn-off switching loss, and the other losses are caused by the start-resistor(s), the circuit loop(s), the transformer(s), the inductor(s), the capacitor(s), the control chip(s), etc. in the switching power converter. For a conventional resonant power converter (for example, an LLC resonant power converter), the primary switching frequency thereof is sharply increased during the status of the load is the light-loading or the no-loading. Accordingly, the light-loading or no-loading loss of the resonant power converter is increased, and the efficiency of the resonant power converter is then decreased.

SUMMARY OF THE INVENTION

In order to solve the problems mentioned in the above "BACKGROUND OF THE INVENTION", an exemplary embodiment of the invention provides a resonant power conversion apparatus. The resonant power conversion apparatus includes a transformer-based resonant converter, a first switch control unit and a second switch control unit, wherein the transformer-based resonant converter includes a primary switch circuit and a secondary output circuit configured to provide an output voltage to a load. The first switch control unit is coupled to the primary switch circuit, and configured to control an ON/OFF operation of the primary switch circuit in response to a status of the load. The second switch control unit is coupled to the first switch control unit, and configured to determine whether to activate or inactivate the first switch control unit.

In an exemplary embodiment of the invention, the transformer-based resonant converter further includes a transformer and a resonant circuit. The transformer has a primary winding, a first secondary winding and a second secondary winding. The resonant circuit is coupled between the primary switch circuit and the primary winding of the transformer, and has a resonance frequency. The secondary output circuit is coupled to the first and the second secondary windings of the transformer, so as to provide the output voltage to the load.

In an exemplary embodiment of the invention, the first switch control unit includes a switch control circuit and a supplying switch. The switch control circuit is operated under an operation voltage, and configured to control the ON/OFF operation of the primary switch circuit in response to the status of the load. The supplying switch is coupled between the switch control circuit and the operation voltage, and controlled by the second switch control unit.

In an exemplary embodiment of the invention, the transformer further has an auxiliary winding. In this case, the second switch control unit includes a detection circuit and a processing unit. The detection circuit is coupled with the auxiliary winding of the transformer in parallel, and configured to generate a detection voltage. The processing unit is coupled to the detection circuit, and configured to output a control signal in response to the detection voltage, so as to determine whether to turn on the supplying switch.

In an exemplary embodiment of the invention, when the detection voltage is not smaller than a first predetermined voltage, the processing unit outputs the control signal to turn on the supplying switch.

In an exemplary embodiment of the invention, the second switch control unit is further coupled to the secondary output circuit to receive the output voltage. In this case, the processing unit is further configured to output the control signal in response to the detection voltage and the output voltage, so as to determine whether to turn on or turn off the supplying switch.

In an exemplary embodiment of the invention, in case that the status of the load is a light loading or a no-loading, when the detection voltage is smaller than the first predetermined voltage and the output voltage is not smaller than a second predetermined voltage, the processing unit outputs the control signal to turn off the supplying switch, wherein the second predetermined voltage is smaller than the first predetermined voltage. Moreover, when the detection voltage is smaller than the first predetermined voltage and the output voltage is smaller than the second predetermined voltage, the processing unit outputs the control signal to turn on the supplying switch.

In an exemplary embodiment of the invention, the second switch control unit may further includes an isolation transmission circuit. The isolation transmission circuit is coupled between the processing unit and the supplying switch, and configured to transmit the control signal output by the processing unit to the supplying switch. Accordingly, the processing unit may output the control signal to control the supplying switch through the isolation transmission circuit.

In an exemplary embodiment of the invention, the detection circuit includes a first diode, a second diode, a detection switch, a capacitor and a resistor. An anode of the first diode is coupled to a common-polarity terminal of the auxiliary winding of the transformer. An anode of the second diode is coupled to a cathode of the first diode, and a cathode of the second diode is configured to generate and output the detection voltage. A control terminal of the detection switch is coupled to the common-polarity terminal of the auxiliary winding of the transformer, a first terminal of the detection switch is coupled to the cathode of the first diode and the anode of the second diode, and a second terminal of the detection switch is coupled to an opposite-polarity terminal of the auxiliary winding of the transformer and grounded. A first terminal of the capacitor is coupled to the cathode of the second diode, and a second terminal of the capacitor is grounded. The resistor is coupled with the capacitor in parallel.

In an exemplary embodiment of the invention, the primary switch circuit may be a half-bridge switch circuit, and the resonant circuit may be at least a series resonant circuit. In this case, the provided resonant power conversion apparatus may be at least adapted for a power supply with a buck power-factor-correction (PFC) converter or with a boost PFC converter.

In an exemplary embodiment of the invention, the primary switch circuit may be a full-bridge switch circuit, and the resonant circuit may be at least a series resonant circuit.

In an exemplary embodiment of the invention, in case that the status of the load is a light-loading or a no-loading, the switch control circuit intermittently controls the ON/OFF operation of the primary switch circuit; otherwise, in case that the status of the load is not the light-loading or the no-loading, the switch control circuit continuously controls the ON/OFF operation of the primary switch circuit.

In an exemplary embodiment of the invention, in case that the status of the load is the light-loading or the no-loading, the first switch control unit is inactivated by the second switch control unit during the primary switch circuit is disabled; otherwise, in case that the status of the load is the light-loading or the no-loading, the first switch control unit is activated by the second switch control unit during the primary switch circuit is enabled.

From the above, when the status of the load is the light-loading or the no-loading, the first switch control unit would intermittently control the ON/OFF operation of the primary switch circuit, so as to reduce the switching frequency corresponding to the primary switch circuit, and thus reducing the light-loading or no-loading loss of the resonant power conversion apparatus; and meanwhile, the first switch control unit is inactivated by the second switch control unit during the primary switch circuit is disabled due to the primary switch circuit does not need to be controlled by the first switch control unit at this time, such that the loss generated from the first switch control unit can be eliminated. Accordingly, the light-loading or no-loading loss of the resonant power conversion apparatus can be further reduced, and thus the efficiency of the resonant power conversion apparatus can be increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
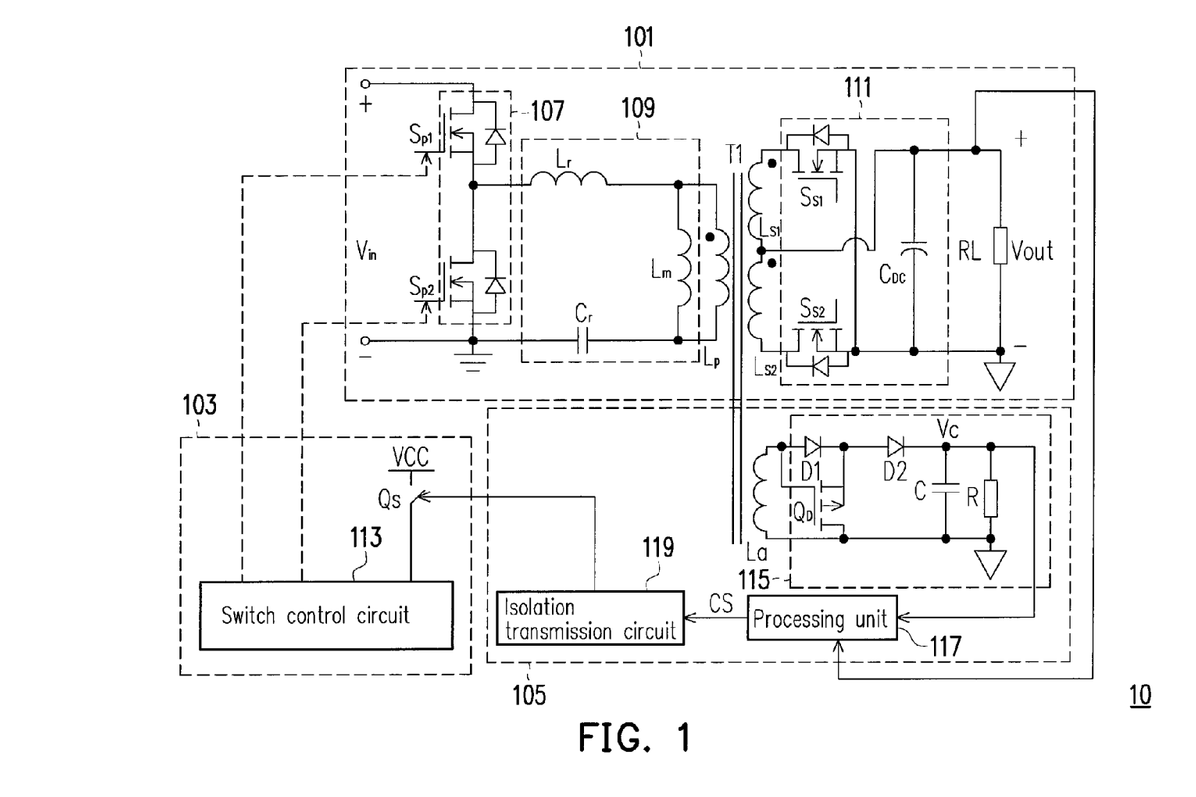
FIG. 1 is a diagram of a resonant power conversion apparatus 10 according to an exemplary embodiment of the invention.

FIG. 1 is a diagram of a resonant power conversion apparatus 10 according to an exemplary embodiment of the invention. Referring to FIG. 1, the resonant power conversion apparatus 10 includes a transformer-based resonant converter 101, a first switch control unit 103 and a second switch control unit 105. In this exemplary embodiment, the transformer-based resonant converter 101 includes a primary switch circuit 107, a resonant circuit 109, a secondary output circuit 111, and a transformer $T_1$ having a primary winding Lp, two secondary winding (Ls1, Ls2) and an auxiliary winding La.

The primary switch circuit 107 may be a half-bridge switch circuit. Accordingly, the primary switch circuit 107 includes two primary switches (Sp1, Sp2), wherein the operation or switching of the primary switches (Sp1, Sp2) is complementary. A drain of the primary switch Sp1 is coupled to a positive terminal (+) of an input voltage Vin, a source of the primary switch Sp1 is coupled to a drain of the primary switch Sp2, and a source of the primary switch Sp2 is coupled to a negative terminal (−) of the input voltage Vin and grounded.

The resonant circuit 109 is coupled between the primary switch circuit 107 and the primary winding Lp of the transformer T1, and has a resonance frequency. In this exemplary embodiment, the resonant circuit 109 may be a series resonant circuit (SRC), but not limited thereto. Accordingly, the resonant circuit 109 includes two inductors (Lr, Lm) and a capacitor Cr. A first terminal of the inductor Lr is coupled to a common node between the primary switches (Sp1, Sp2), and a second terminal of the inductor Lr is coupled to a common-polarity terminal (i.e. dotted terminal) of the primary winding Lp of the transformer T1. The inductor Lm is coupled with the primary winding Lp in parallel. A first terminal of the capacitor Cr is coupled to an opposite-polarity terminal (i.e. non-dotted terminal) of the primary winding Lp of the transformer T1, and a second terminal of the capacitor Cr is grounded. It is noted that, in the other exemplary embodiment, the resonant circuit 109 may be a parallel resonant circuit (PRC) or a series-parallel resonant circuit (SPRC), so the configuration of the resonant circuit 109 can be determined by real design or application requirement.

The secondary output circuit 111 is coupled to the secondary windings (Ls1, Ls2) of the transformer T1, and configured to provide an output voltage Vout to a load RL. In this exemplary embodiment, the secondary output circuit 111 includes two secondary switches (Ss1, Ss2) and a capacitor $C_{DC}$. A drain of the secondary switch Ss1 is coupled to a common-polarity terminal (i.e. dotted terminal) of the secondary winding Ls1 of the transformer T1. A source of the secondary switch Ss1 is grounded, and coupled to a source of the secondary switch Ss2 and a negative terminal (−) of the output voltage Vout.

A drain of the secondary switch Ss2 is coupled to an opposite-polarity terminal (i.e. non-dotted terminal) of the secondary winding Ls2 of the transformer T1. A first terminal of the capacitor $C_{DC}$ is coupled to an opposite-polarity terminal (i.e. non-dotted terminal) of the secondary winding Ls1 of the transformer T1, a common-polarity terminal (i.e. dotted terminal) of the secondary winding Ls2 of the transformer T1, and a positive terminal (+) of the output voltage Vout, and a second terminal of the capacitor $C_{DC}$ is grounded. The load RL is coupled with the capacitor $C_{DC}$ in parallel. It is noted that the secondary switches (Ss1, Ss2) may be implemented by synchronous rectifiers (SR), but not limited thereto.

On the other hand, the first switch control unit 103 is coupled to the primary switch circuit 107 in the transformer-based resonant converter 101, and configured to control an ON/OFF operation of the primary switch circuit 107 in response to a status of the load RL. In this exemplary embodiment, the first switch control unit 103 includes a switch control circuit 113 and a supplying switch Qs. The switch control circuit 113 is operated under an operation voltage VCC, and configured to control the ON/OFF operation of the primary switch circuit 107 in response to the status of the load RL. The supplying switch Qs is coupled between the switch control circuit 113 and the operation voltage VCC, and controlled by the second switch control unit 105. In other words, the operation VCC is coupled to the switch control circuit 113 through the supplying switch Qs.

It is noted that the switch control circuit 113 of the first switch control unit 103 may further be coupled to the load RL, such that the switch control circuit 113 may further be configured to receive the parameter relating to the road RL (for example, the feedback signal corresponding to the voltage (Vout) or current ($I_{RL}$) on the load RL), and output the corresponding control signals to control the ON/OFF operation of the primary switch circuit 107 after the received parameter is processed by the internal circuit of the switch control circuit 113. Since the mechanism of controlling, based on the parameter relating to the road RL, the ON/OFF operation of the primary switch circuit 107 is a general power switching control manner, so the real connection between the road RL and the switch control circuit 113 would not be specifically shown on FIG. 1.

Furthermore, the second switch control unit 105 is coupled to the first switch control unit 103, and configured to determine whether to activate or inactivate the first switch control unit 103. In this exemplary embodiment, the second switch control unit 105 includes a detection circuit 115, a processing unit 117 and an isolation transmission circuit 119. The detection circuit 115 is coupled with the auxiliary winding La of the transformer T1 in parallel, and configured to generate a detection voltage Vc.

To be specific, the detection circuit 115 includes diodes (D1, D2), a detection switch $Q_D$, a capacitor C and a resistor R. An anode of the diode D1 is coupled to a common-polarity terminal (i.e. dotted terminal) of the auxiliary winding La of the transformer T1. An anode of the diode D2 is coupled to a cathode of the diode D1, and a cathode of the diode D2 is configured to generate and output the detection voltage Vc. A control terminal of the detection switch QD is coupled to the common-polarity terminal (i.e. dotted terminal) of the auxiliary winding La of the transformer T1, a first terminal (i.e. drain) of the detection switch $Q_D$ is coupled to the cathode of the diode D1 and the anode of the diode D2, and a second terminal (i.e. source) of the detection switch $Q_D$ is coupled to an opposite-polarity terminal (i.e. non-dotted terminal) of the auxiliary winding La of the transformer T1 and grounded. A first terminal of the capacitor C is coupled to the cathode of the diode D2, and a second terminal of the capacitor C is grounded. The resistor R is coupled with the capacitor C in parallel.

The processing unit 117 is coupled to the detection circuit 115, and configured to output a control signal CS in response to the detection voltage Vc, so as to determine whether to turn on the supplying switch Qs. In addition, the second switch control unit 105 is further coupled to the secondary output circuit 111 in the transformer-based resonant converter 101 to receive the output voltage Vout, such that the processing unit 117 is further configured to output the control signal CS in response to the detection voltage Vc and the output voltage Vout, so as to determine whether to turn on or turn off the supplying switch Qs. It is noted that the processing unit 117 may also be configured to control the ON/OFF operation of the secondary switches (Ss1, Ss2), but not limited thereto.

The isolation transmission circuit 119 is coupled between the processing unit 117 and the supplying switch Qs, and configured to transmit the control signal CS output by the processing unit 117 to (a control terminal of) the supplying switch Qs. In other words, the processing unit 117 outputs the control signal CS to control the supplying switch Qs through the isolation transmission circuit 119. It is noted that the isolation transmission circuit 119 may be implemented by an opto-isolator or an optical coupler, but not limited thereto.

Figure 2:
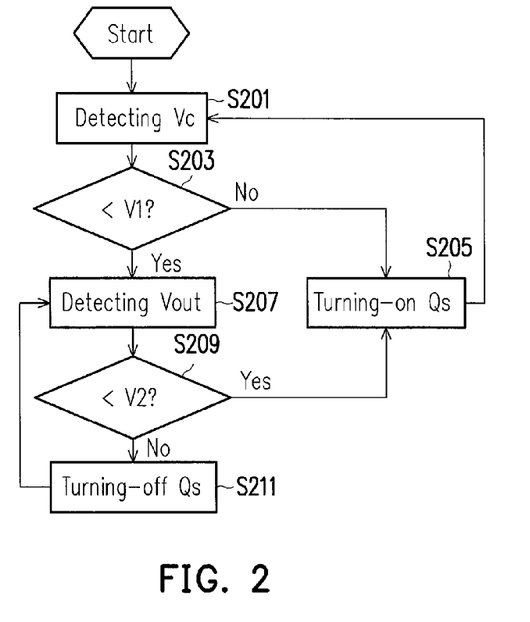
FIG. 2 is a control and determination flow chart of the processing unit 117 in FIG. 1.
Figure 3:
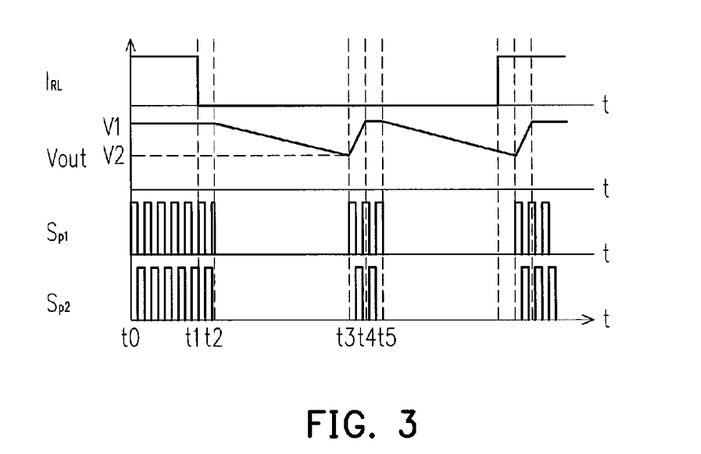
FIG. 3 is a part of operation waveforms of the resonant power conversion apparatus 10 in FIG. 1.

From the above, FIG. 2 is a control and determination flow of the processing unit 117 in FIG. 1, and FIG. 3 is a part of operation waveforms of the resonant power conversion apparatus 10 in FIG. 1, wherein the operation waveforms of the current $I_{RL}$ of the load RL, the output voltage Vout, and the gate control signals of the primary switches (Sp1, Sp2) are shown in FIG. 3. Referring to FIGS. 1 and 3, during the operation of the resonant power conversion apparatus 10, the processing unit 117 would detect the detection voltage Vc (S201), and determine whether the detection voltage Vc is smaller than a first predetermined voltage V1 (S203).

When the processing unit 117 detects and determines that the detection voltage Vc is not smaller than the first predetermined voltage V1, for example, at times t0-t1, it represents that the status of the load RL is not the light-loading or the no-loading. Accordingly, the processing unit 117 would output the control signal CS to turn on the supplying switch Qs through the isolation transmission circuit 119 (S205), such that the switch control circuit 113 would be operated under the operation voltage VCC, and continuously control the ON/OFF operation of the primary switch circuit 107.

At time t1, due to the current $I_{RL}$ of the load RL is sharply decreased, so the status of the load RL can be seen as the light-loading or the no-loading. Accordingly, the first switch control unit 103 would intermittently control the ON/OFF operation of the primary switch circuit 107, so as to reduce the switching frequency corresponding to the primary switch circuit 107, and thus reducing the light-loading or no-loading loss of the resonant power conversion apparatus 10.

In case that the status of the load RL is the light-loading or the no-loading, the processing unit 117 would continuously detect the detection voltage Vc (S201), and determine whether the detection voltage Vc is smaller than a first predetermined voltage V1 (S203). At time t2, when the processing unit 117 detects and determines that the detection voltage Vc is smaller than the first predetermined voltage V1, the processing unit 117 would further detect the output voltage Vout (S207), and determine whether the output voltage Vout is smaller than a second predetermined voltage V2 which is smaller than the first predetermined voltage V1 (S209).

When the processing unit 117 detects and determines that the output voltage Vout is not smaller than the second predetermined voltage V2, the processing unit 117 would output the control signal CS to turn off the supplying switch Qs through the isolation transmission circuit 119 (S211), such that the first switch control unit 103 is inactivated by the second switch control unit 105 during the primary switch circuit 107 is disabled in case that the status of the load RL is the light-loading or the no-loading.

When the supplying switch Qs is turned off after time t2, the processing unit 117 would continuously detect (S207) and determine (S209) whether the output voltage Vout is smaller than the second predetermined voltage V2. Once the processing unit 117 detects and determines that the output voltage Vout is smaller than the second predetermined voltage V2 at time t3, the processing unit 117 would output the control signal CS to turn on the supplying switch Qs through the isolation transmission circuit 119 (S205), such that the switch control circuit 113 would be operated under the operation voltage VCC again, and continuously control the ON/OFF operation of the primary switch circuit 107 until the detection voltage Vc rises to and maintains at the first predetermined voltage V1 at times t3-t5 (S201-S205). Obviously, the first switch control unit 103 is activated again by the second switch control unit 105 during the primary switch circuit 107 is enabled in case that the status of the load RL is the light-loading or the no-loading.

In brief, in case that the status of the load RL is the light loading or the no-loading, the control and determination of the processing unit 117 is that: 1) when the detection voltage Vc is not smaller than the first predetermined voltage V1, the processing unit 117 outputs the control signal CS to turn on the supplying switch Qs; 2) when the detection voltage Vc is smaller than the first predetermined voltage V1 and the output voltage Vout is not smaller than the second predetermined voltage V2, the processing unit 117 outputs the control signal CS to turn off the supplying switch Qs; and 3) when the detection voltage Vc is smaller than the first predetermined voltage V1 and the output voltage Vout is smaller than the second predetermined voltage V2, the processing unit 117 outputs the control signal CS to turn on the supplying switch Qs.

It is clearly known that when the status of the load RL is the light-loading or the no-loading, the first switch control unit 103 would intermittently control the ON/OFF operation of the primary switch circuit 107, so as to reduce the switching frequency corresponding to the primary switch circuit 107, and thus reducing the light-loading or no-loading loss of the resonant power conversion apparatus 10; and meanwhile, the first switch control unit 103 is inactivated by the second switch control unit 105 during the primary switch circuit 107 is disabled due to the primary switch circuit 107 does not need to be controlled by the first switch control unit 105, such that the loss generated from the first switch control unit 105 can be eliminated. Accordingly, the light-loading or no-loading loss of the resonant power conversion apparatus 10 can be further reduced, and thus increasing the efficiency of the resonant power conversion apparatus 10.

Figure 4:
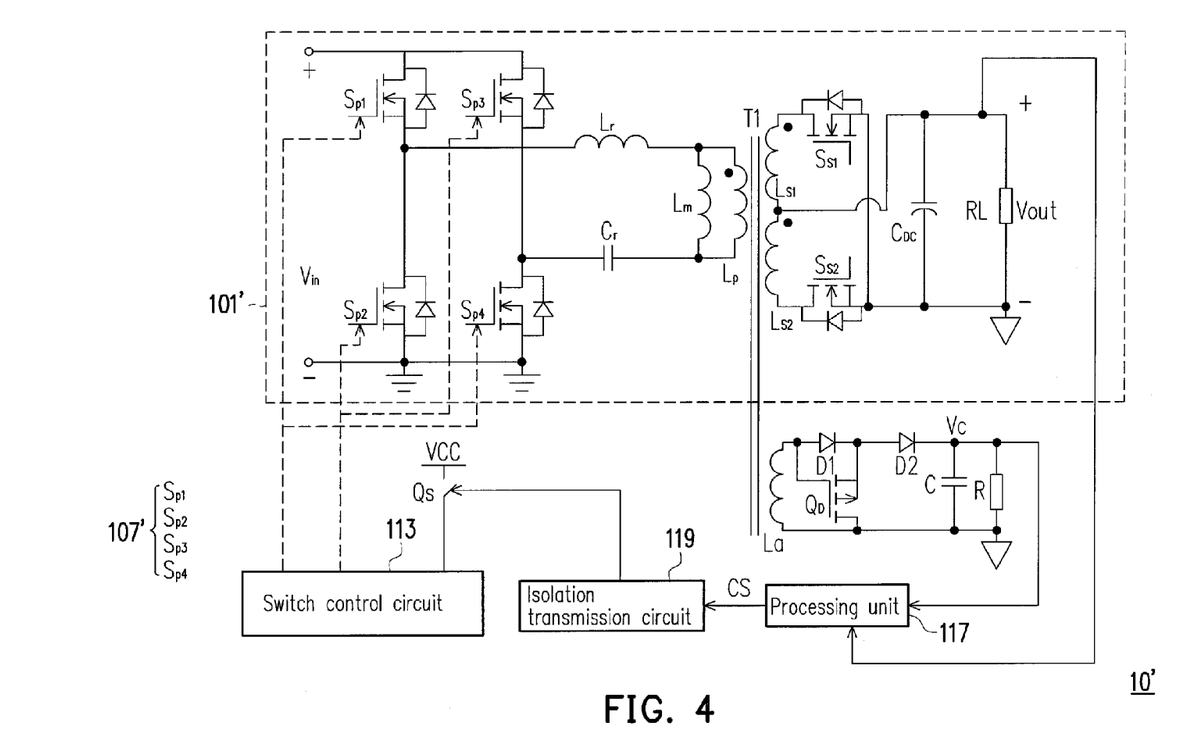
FIG. 4 is a diagram of a resonant power conversion apparatus 10' according to another exemplary embodiment of the invention.

FIG. 4 is a diagram of a resonant power conversion apparatus 10' according to another exemplary embodiment of the invention. Referring to FIGS. 1 and 4, the difference between the resonant power conversion apparatus 10 and 10' is only that the configuration of the primary switch circuit 107' of the transformer-based resonant converter 101' is different from that of the primary switch circuit 107 of the transformer-based resonant converter 101. To be specific, as shown in FIG. 4, the primary switch circuit 107' may be a full-bridge switch circuit, and further includes two primary switches (Sp3, Sp4) than the primary switch circuit 107. In this exemplary embodiment, the primary switches (Sp1, Sp4) are synchronously switched, the primary switches (Sp2, Sp3) are synchronously switched, but the switching of the primary switches (Sp1, Sp4) is complementary to that of the primary switches (Sp2, Sp3). However, the switching of the primary switches (Sp1, Sp2, Sp3, Sp4) can be determined by the real design or application requirement. Besides, the operation of the resonant power conversion apparatus 10' is substantially the same as that of the resonant power conversion apparatus 10, so the detailed descriptions thereto should be omitted.

Figure 5:
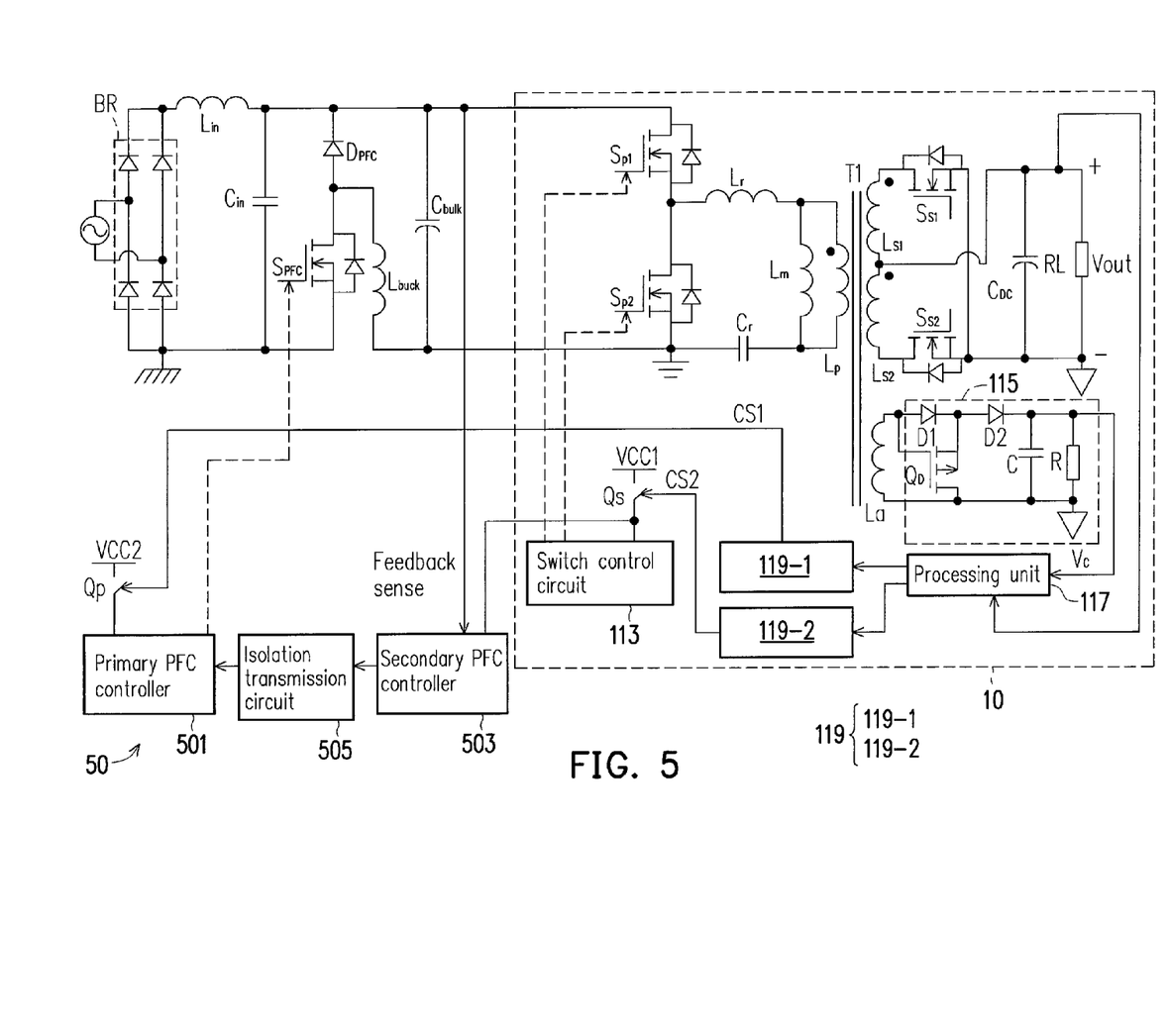
FIG. 5 is a diagram of the resonant power conversion apparatus 10 applied in a power supply 50 with a buck power-factor-correction (PFC) converter.
Figure 6:
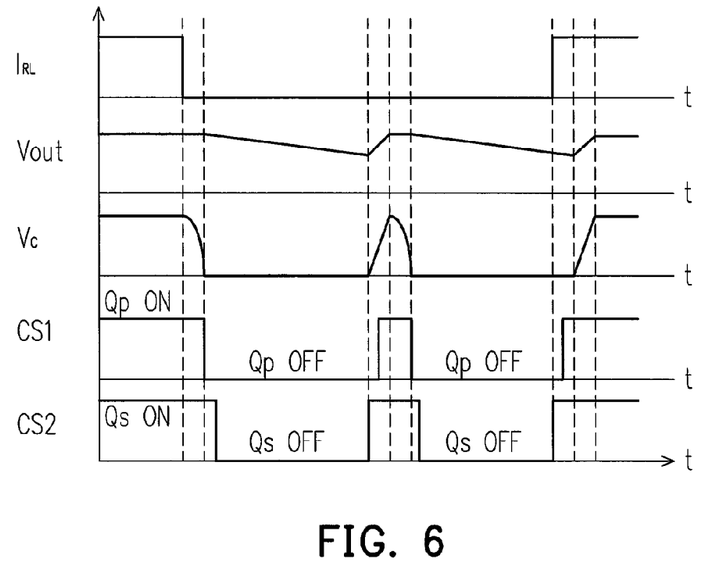
FIG. 6 is a part of operation waveforms of the power supply 50 with the buck PFC converter in FIG. 5.

FIG. 5 is a diagram of the resonant power conversion apparatus 10 applied in a (switching) power supply 50 with a buck power-factor-correction (PFC) converter, and FIG. 6 is a part of operation waveforms of the power supply 50 with the buck PFC converter in FIG. 5. Referring to FIGS. 5 and 6, except for the resonant power conversion apparatus 10, the power supply 50 with the buck PFC converter additionally includes a primary PFC controller 501, a secondary PFC controller 503, an isolation transmission circuit 505 coupled between the primary PFC controller 501 and the secondary PFC controller 503, a bridge rectifier BR, inductors (Lin, $L_{buck}$), capacitors (Cin, $C_{bulk}$), a diode $D_{PFC}$ and switches ($S_{PFC}$, Qp). In this case, the isolation transmission circuit 119 includes two isolation transmission sub-circuits (119-1, 119-2), and the processing unit 117 would output the control signals (CS1, CS2) to respectively control the switches (Qp, Qs) in response to the detection voltage Vc and the output voltage Vout.

As shown in FIG. 6, the detection voltage Vc detected and output by the detection circuit 115 is not changed during the normal operation of the power supply 50 with the buck PFC converter (i.e. the status of the load RL is not the light-loading or no-loading). On the other hand, the detection voltage Vc detected and output by the detection circuit 115 is changed with the status of the load RL during the switch control circuit 113 intermittently controls the ON/OFF operation of the primary switches (Sp1, Sp2) (i.e. the status of the load RL is the light-loading or no-loading).

It is noted that the input and the output of the power supply 50 with the buck PFC converter do not have the common ground, so the operation voltage VCC1 of the switch control circuit 113 and the secondary PFC controller 503 is different from the operation voltage VCC2 of the primary PFC controller 501. In this case, when the buck PFC converter in the power supply 50 would be inactivated in case that the status of the load RL is the light-loading or the no-loading, the primary PFC controller 501 must be firstly and early inactivated than the secondary PFC controller 503. In other words, the processing unit 117 would output the control signals (CS1, CS2) to respectively control the switches (Qp, Qs), so as to firstly inactivate the primary PFC controller 501, and then inactivate the secondary PFC controller 503.

Accordingly, the power supply 50 with the buck PFC converter can be surly avoided from damaging due to the over voltage caused and generated by turning on the primary switch $S_{PFC}$ at long time in response to the zero secondary feedback. In addition, the loss generated from the switch control circuit 113 (i.e. the first switch control circuit 103), the primary PFC controller 501 and the secondary PFC controller 503 can be eliminated, so the light-loading or no-loading loss of the power supply 50 with the buck PFC converter can be reduced, and then the efficiency of the power supply 50 with the buck PFC converter can be increased.

On the other hand, when the buck PFC converter in the power supply 50 would be activated regardless of the status of the load RL, the secondary PFC controller 503 must be early activated than the primary PFC controller 501. In other words, the processing unit 117 would output the control signals (CS1, CS2) to respectively control the switches (Qp, Qs), so as to firstly activate the secondary PFC controller 503, and then activate the primary PFC controller 501. Obviously, the timing control of activating or inactivating the buck PFC converter in the power supply 50 must follow a certain rule as shown in FIG. 6.

Figure 7:
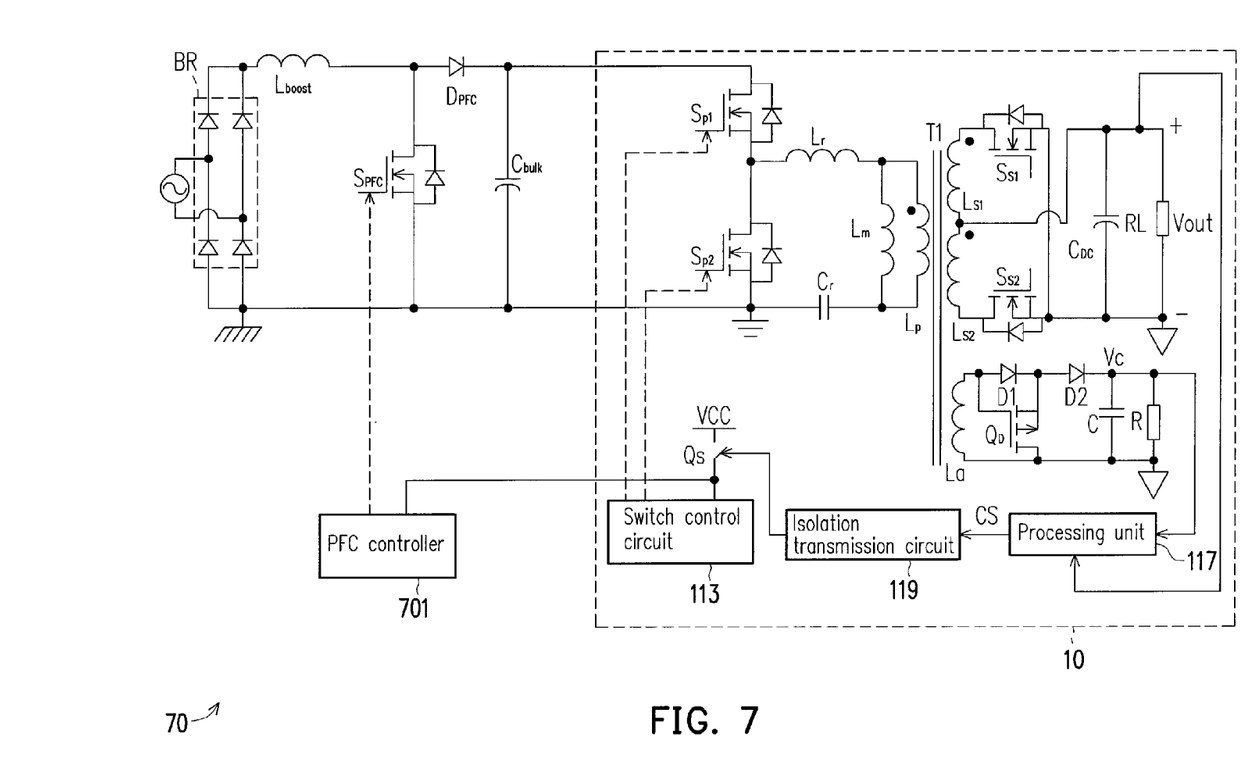
FIG. 7 is a diagram of the resonant power conversion apparatus 10 applied in a power supply 70 with a boost power-factor-correction (PFC) converter.

FIG. 7 is a diagram of the resonant power conversion apparatus 10 applied in a (switching) power supply 70 with a boost power-factor-correction (PFC) converter. Referring to FIG. 7, except for the resonant power conversion apparatus 10, the power supply 70 with the boost PFC converter additionally includes a PFC controller 701, a bridge rectifier BR, an inductor $L_{boost}$, a capacitor $C_{bulk}$, a diode $D_{PFC}$ and a switch $S_{PFC}$. The operation and configuration of the power supply 70 with the boost PFC converter are simple to that of the power supply 50 with the buck PFC converter.

To be specific, the operation voltage VCC of the switch control circuit 113 and the PFC controller 701 is the same, so when the boost PFC converter in the power supply 70 would be inactivated in case that the status of the load RL is the light-loading or the no-loading, the switch control circuit 113 and the PFC controller 701 can be simultaneously inactivated by the control of the processing unit 117. On the other hand, when boost PFC converter in the power supply 70 would be activated regardless of the status of the load RL, the switch control circuit 113 and the PFC controller 701 can be simultaneously activated by the control of the processing unit 117. Similarly, the loss generated from the switch control circuit 113 (i.e. the first switch control unit 103) and the PFC controller 701 can be eliminated, so the light-loading or no-loading loss of the power supply 70 with the boost PFC converter can be reduced, and then the efficiency of the power supply 70 with the boost PFC converter can be increased.

It is noted that in accordance with the above exemplary embodiments, the full-load efficiency of the resonant power conversion apparatus (10, 10') operated under 115V/50 Hz can achieve up to or higher than at least 92%, and the no-load loss of the resonant power conversion apparatus (10, 10') operated under 115V/50 Hz can even achieve down to or lower than at least 30 mW.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A resonant power conversion apparatus, comprising:
   a transformer-based resonant converter, comprising:
      a primary switch circuit; and
      a secondary output circuit, configured to provide an output voltage to a load;
   a first switch control unit, coupled to the primary switch circuit, and configured to control an ON/OFF operation of the primary switch circuit in response to a status of the load; and
   a second switch control unit, coupled to the first switch control unit, and configured to determine whether to activate or inactivate the first switch control unit.

2. The resonant power conversion apparatus according to claim 1, wherein the transformer-based resonant converter further comprises:
   a transformer, having a primary winding at a primary side and a first and a second secondary windings both at a secondary side; and
   a resonant circuit, coupled between the primary switch circuit and the primary winding of the transformer, and having a resonance frequency,
   wherein the secondary output circuit is coupled to the first and the second secondary windings of the transformer, so as to provide the output voltage to the load.

3. The resonant power conversion apparatus according to claim 2, wherein the first switch control unit comprises:
   a switch control circuit, operated under an operation voltage, and configured to control the ON/OFF operation of the primary switch circuit in response to the status of the load; and
   a supplying switch, coupled between the switch control circuit and the operation voltage, and controlled by the second switch control unit.

4. The resonant power conversion apparatus according to claim 3, wherein the transformer further has an auxiliary winding at a secondary side, and the second switch control unit comprises:
   a detection circuit, coupled with the auxiliary winding of the transformer in parallel, and configured to generate a detection voltage; and
   a processing unit, coupled to the detection circuit, and configured to output a control signal in response to the detection voltage, so as to determine whether to turn on the supplying switch.

5. The resonant power conversion apparatus according to claim 4, wherein when the detection voltage is not smaller than a first predetermined voltage, the processing unit outputs the control signal to turn on the supplying switch.

6. The resonant power conversion apparatus according to claim 4, wherein the second switch control unit is further coupled to the secondary output circuit to receive the output voltage, and the processing unit is further configured to output the control signal in response to the detection voltage and the output voltage, so as to determine whether to turn on or turn off the supplying switch.

7. The resonant power conversion apparatus according to claim 6, wherein in case that the status of the load is a light loading or a no-loading,
   when the detection voltage is smaller than the first predetermined voltage and the output voltage is not smaller than a second predetermined voltage, the processing unit outputs the control signal to turn off the supplying switch, wherein the second predetermined voltage is smaller than the first predetermined voltage; and
   when the detection voltage is smaller than the first predetermined voltage and the output voltage is smaller than the second predetermined voltage, the processing unit outputs the control signal to turn on the supplying switch.

8. The resonant power conversion apparatus according to claim 6, wherein the second switch control unit further comprises:
   an isolation transmission circuit, coupled between the processing unit and the supplying switch, and configured to transmit the control signal output by the processing unit to the supplying switch,
   wherein the processing unit outputs the control signal to control the supplying switch through the isolation transmission circuit.

9. The resonant power conversion apparatus according to claim 8, wherein the detection circuit comprises:
   a first diode, having an anode coupled to a common-polarity terminal of the auxiliary winding of the transformer;
   a second diode, having an anode coupled to a cathode of the first diode, and a cathode generating and outputting the detection voltage;
   a detection switch, having a control terminal coupled to the common-polarity terminal of the auxiliary winding of the transformer, a first terminal coupled to the cathode of the first diode and the anode of the second diode, and a second terminal coupled to an opposite-polarity terminal of the auxiliary winding of the transformer and grounded;
   a capacitor, having a first terminal coupled to the cathode of the second diode, and a second terminal being grounded; and
   a resistor, coupled with the capacitor in parallel.

10. The resonant power conversion apparatus according to claim 8, wherein the primary switch circuit is a half-bridge switch circuit, and the resonant circuit is at least a series resonant circuit.

11. The resonant power conversion apparatus according to claim 10, wherein the resonant power conversion apparatus is at least adapted for a power supply with a buck power-factor-correction (PFC) converter.

12. The resonant power conversion apparatus according to claim 10, wherein the resonant power conversion apparatus is at least adapted for a power supply with a boost PFC converter.

13. The resonant power conversion apparatus according to claim 8, wherein the primary switch circuit is a full-bridge switch circuit, and the resonant circuit is at least a series resonant circuit.

14. The resonant power conversion apparatus according to claim 3, wherein:

in case that the status of the load is a light-loading or a no-loading, the switch control circuit intermittently controls the ON/OFF operation of the primary switch circuit; and in case that the status of the load is not the light-loading or the no-loading, the switch control circuit continuously controls the ON/OFF operation of the primary switch circuit.

15. The resonant power conversion apparatus according to claim 14, wherein:

in case that the status of the load is the light-loading or the no-loading, the first switch control unit is inactivated by the second switch control unit during the primary switch circuit is disabled; and in case that the status of the load is the light-loading or the no-loading, the first switch control unit is activated by the second switch control unit during the primary switch circuit is enabled.

\* \* \* \* \*